June 30. 1925.  
J. C. SMITH  
SEMIAERO DIRIGIBLE  
Filed Dec. 2, 1924   2 Sheets-Sheet 1
1,544,190
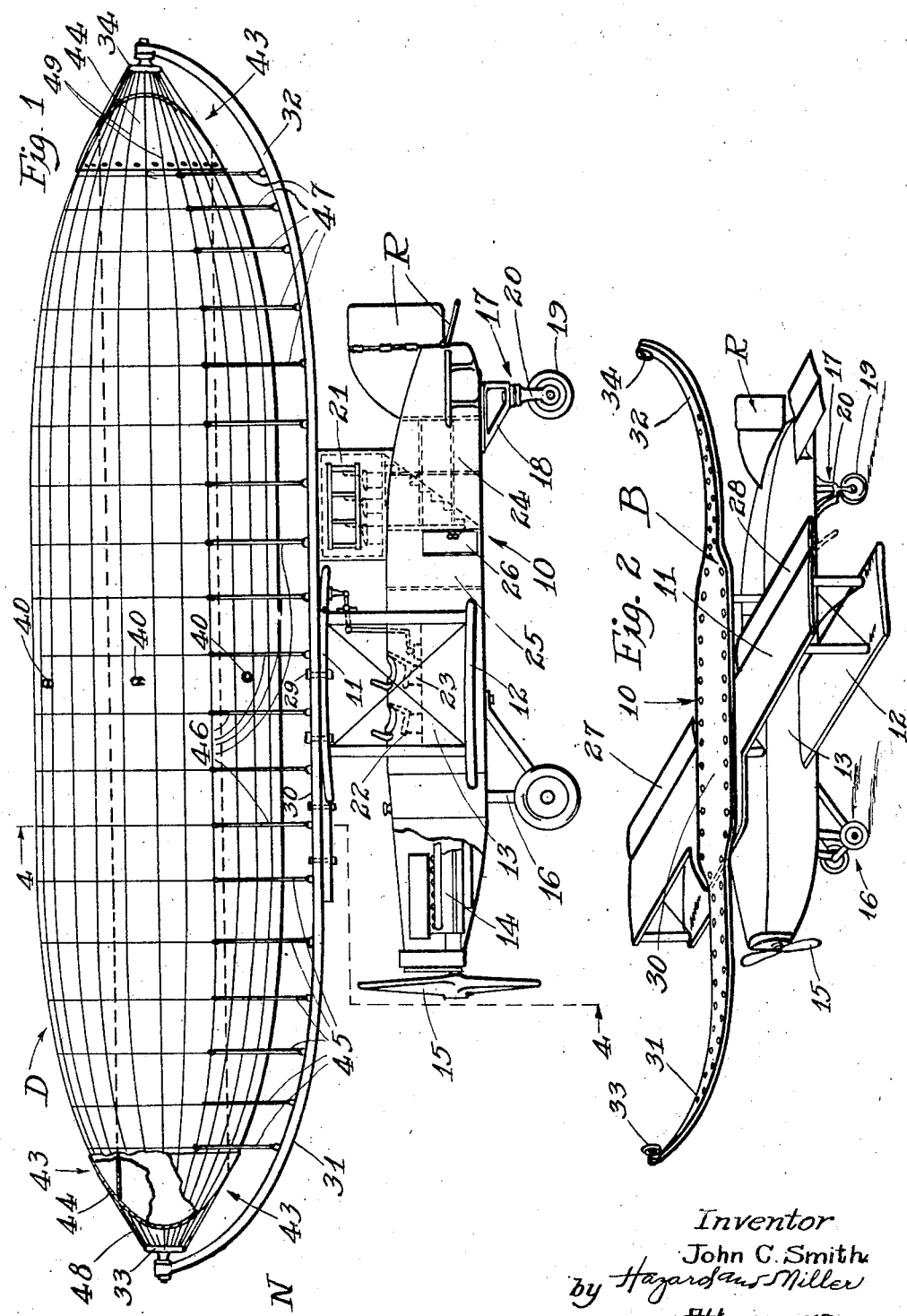
Inventor
John C. Smith
by Hazard and Miller
Attorneys

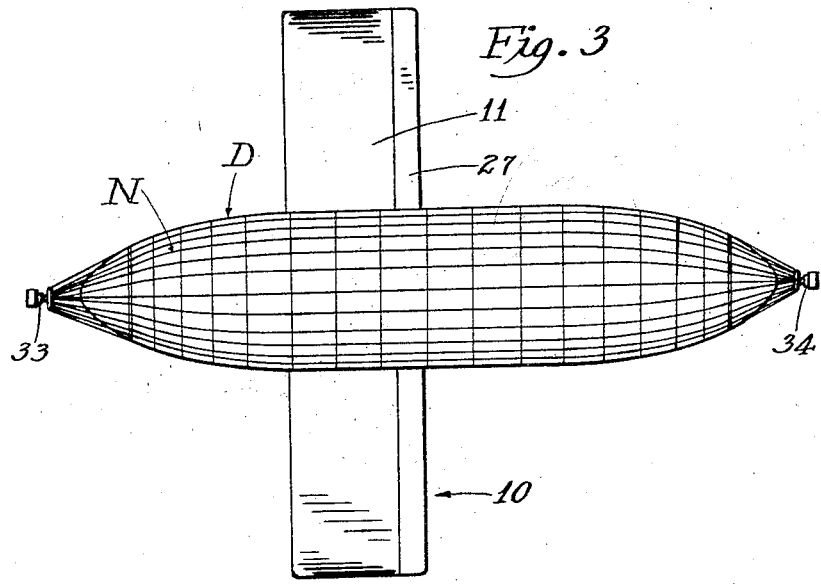
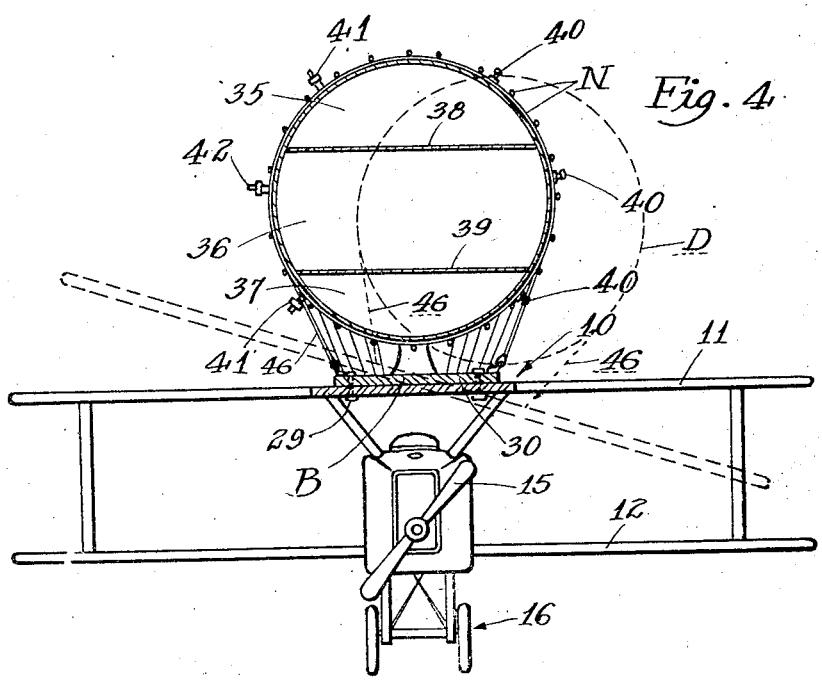

Patented June 30, 1925.

1,544,190

UNITED STATES PATENT OFFICE.

JOHN C. SMITH, OF LOS ANGELES, CALIFORNIA.

SEMIAERO DIRIGIBLE.

Application filed December 2, 1924. Serial No. 753,434.

*To all whom it may concern:*

Be it known that I, JOHN C. SMITH, a citizen of the United States, residing at Los Angeles, in the county of Los Angeles and State of California, have invented new and useful Improvements in Semiaero Dirigibles, of which the following is a specification.

This invention relates to aircraft.

The object of this invention is to provide a combined aeroplane and dirigible balloon, hereinafter referred to as a semi-aero dirigible, the dirigible balloon being of sufficient size and buoyancy to practically overcome the weight of the aeroplane.

Another object of the invention is to provide an aircraft of a character referred to having the safety of a dirigible balloon and approximate speed of an aeroplane.

Another object is to provide an aircraft of the character referred to capable of ascending or descending at a very steep angle, moving at any desired speed and which will descend very gradually even though the power plant of the aeroplane forming part of the aircraft should stop or break down.

These objects are attained by the disclosure hereinafter set forth by the following description of the accompanying drawings, the novel features thereof being particularly pointed out in the appended claims, in which Figure 1 is a side elevation of a semi-aero dirigible.

Fig. 2 is a perspective view of an aeroplane forming part of the invention, the dirigible balloon being removed.

Fig. 3 is a top plan view of the semi-aero dirigible.

Fig. 4 is a section taken on the line 4—4 of Fig. 1.

Referring by numerals to the accompanying drawings, 10 designates an aeroplane, preferably of the tractor type, having planes 11 and 12, a fuselage 13, motor 14 and propeller 15. The aeroplane is provided with a landing gear 16 which may be of any standard construction, mounted near the forward end of the aeroplane. A landing gear 17 of special construction is mounted on the rear portion of the aeroplane and consists of a frame 18 and a wheel 19 pivotally connected to the frame 18 by means of a yoke 20. The aeroplane may be of considerable size, having a passenger compartment 21, the top of which is on a level with the top of the plane 11.

A pilot's seat 22 and a mechanic's seat 23 are located in the fuselage 13. Sleeping quarters 24 and storage compartments 25 are situated in the rear end of the aeroplane, access being had to the interior by means of a door 26. The direction of flight, that is to the right or left, is controlled by the usual rudder, generally designated at R, which may be controlled in the usual manner by connections not shown.

Wings 27 and 28 are pivotally connected to the plane 11 and are adapted to cause the semi-aero dirigible to ascend or descend by tilting. A beam generally designated at B has a wide portion 30 and is rigidly secured to the plane 11 and passenger compartment 21 by means of bolts or other suitable fastening means indicated at 29. The beam B has upwardly turned ends 31 and 32 to which are rigidly connected members 33 and 34.

A substantially cigar-shaped dirigible balloon (constructed of any suitable airtight material) is designated at D. The dirigible balloon is divided into three compartments 35, 36 and 37, these compartments being formed by longitudinal partitions 38 and 39, each compartment being provided with a safety valve 40 and an inflating tube 41 provided with a check valve 42. The end portions 43 of the dirigible balloon are provided with caps 44 formed of light metal such as aluminum, which are adapted to prevent the ends from collapsing.

A net N covers the dirigible balloon. The forward portion of the net is connected to the upwardly turned end 31 of the beam B by a series of guy ropes 45, the central portion of the net being connected to the wide portion 30 of the beam B by a series of guy ropes 46 and the rear portion of the net being connected to the upwardly turned end 32 of the beam B by a series of guy ropes 47. A series of guy ropes 48 is connected to the forward end of the net and member 33. The rear end of the net is connected to the member 34 by a series of guy ropes 49.

It will be noted that the aeroplane and dirigible balloon maintain the same relative positions when assuming an angle as indicated in dotted lines in Fig. 4, these relative positions being maintained by the guy ropes 46 which are connected to the outer edges of the wide portion 30 of the beam B, and being tangent to the curvature of the dirigible balloon D.

From the construction it will be seen that the semi-aero dirigible is capable of ascending at a comparatively steep angle by tilting the wings 27 and 28 downward, the velocity not being necessarily very great as the weight of the aeroplane is practically eliminated by the buoyancy of the dirigible balloon. Due to the high factor of safety afforded by the dirigible balloon, the semi-aero dirigible may be operated extensively for pleasure trips by amateur pilots, as little or no danger would result in the event that the motor should stop or one of the compartments of the dirigible balloon should collapse, it being understood that the remaining compartments have sufficient buoyancy to prevent sudden descent.

Various changes may be made without departing from the spirit of the invention as claimed.

What is claimed is:

1. An aircraft comprising a dirigible balloon and an aeroplane, said dirigible balloon having compartments therein, a net covering said dirigible balloon, said aeroplane having an upper and lower plane, wings pivoted to the rear end of said upper plane, a beam having upwardly turned ends secured to said upper plane, and guy ropes connecting said net to said beam.

2. An aircraft comprising a substantially cigar-shaped balloon and a tractor type aeroplane, said balloon having a plurality of longitudinal compartments, caps mounted on each end of said balloon, a net covering said balloon, said aeroplane having a fuselage, upper and lower planes adjacent said fuselage, a passenger compartment mounted on said fuselage, the top of which is flush with the top of the upper plane, a beam having oppositely disposed upwardly turned ends secured to the upper plane and top of the passenger compartment, and a series of guy ropes connecting said net to said beam.

3. An aircraft comprising a substantially cigar-shaped balloon and a biplane aeroplane, the planes of said biplane aeroplane set at right angles to the length of said substantially cigar-shaped balloon, a beam having upturned ends secured to the upper plane of said biplane aeroplane, a net covering said substantially cigar-shaped balloon and guy ropes connecting said net surrounding said substantially cigar-shaped balloon to said beams secured to the upper plane of said biplane aeroplane.

4. An aircraft comprising a substantially cigar-shaped balloon and an aeroplane having upper and lower planes, said aeroplane being set at right angles to said substantially cigar-shaped balloon, a beam having upturned ends secured to said upper plane, a net formed of horizontal and vertical strands surrounding said cigar-shaped balloon, a plurality of guy ropes extending upwardly from said beam and connected to said net at the intersecting points of the vertical and horizontal strands of said net, rope receiving members being secured to the extremities of the upturned ends of said beams and a plurality of guy ropes connecting the ends of said net to said rope receiving member.

In testimony whereof I have signed my name to this specification.

JOHN C. SMITH.